(12) United States Patent
Bergeson et al.

(10) Patent No.: US 9,369,494 B2
(45) Date of Patent: Jun. 14, 2016

(54) TECHNIQUES FOR ESTABLISHING A TRUSTED CLOUD SERVICE

(71) Applicant: Novell, Inc., Provo, UT (US)

(72) Inventors: Bruce L. Bergeson, American Fork, UT (US); Carl Tietjen, San Diego, CA (US); Carolyn B. McClain, Springville, UT (US); Larry Hal Henderson, Orem, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 136 days.

(21) Appl. No.: 14/458,523

(22) Filed: Aug. 13, 2014

(65) Prior Publication Data
US 2014/0351894 A1 Nov. 27, 2014

Related U.S. Application Data

(62) Division of application No. 13/100,937, filed on May 4, 2011, now Pat. No. 8,813,192.

(51) Int. Cl.
*H04L 29/06* (2006.01)

(52) U.S. Cl.
CPC .......... *H04L 63/205* (2013.01); *H04L 63/0823* (2013.01); *H04L 63/105* (2013.01); *H04L 63/20* (2013.01)

(58) Field of Classification Search
CPC .................................................. H04L 63/205
See application file for complete search history.

(56) References Cited

U.S. PATENT DOCUMENTS

| | | | | |
|---|---|---|---|---|
| 8,341,427 | B2 * | 12/2012 | Auradkar | H04L 9/083 713/189 |
| 8,468,244 | B2 * | 6/2013 | Redlich | G06Q 10/06 705/50 |
| 8,813,192 | B2 | 8/2014 | Bergeson | |
| 2006/0015580 | A1 * | 1/2006 | Gabriel | H04N 7/17309 709/219 |
| 2006/0031510 | A1 * | 2/2006 | Beck | H04L 12/585 709/226 |
| 2009/0254572 | A1 * | 10/2009 | Redlich | G06Q 10/06 |
| 2010/0211781 | A1 * | 8/2010 | Auradkar | G06F 21/6209 713/168 |
| 2010/0211782 | A1 * | 8/2010 | Auradkar | H04L 9/083 713/168 |
| 2010/0250497 | A1 * | 9/2010 | Redlich | F41H 13/00 707/661 |
| 2010/0317420 | A1 * | 12/2010 | Hoffberg | G06Q 30/0207 463/1 |
| 2011/0047381 | A1 * | 2/2011 | Ganesan | G06F 21/6218 713/169 |
| 2011/0296201 | A1 * | 12/2011 | Monclus | G06F 21/53 713/190 |

(Continued)

OTHER PUBLICATIONS

Kapadia et al.; Secure cloud computing with brokered trusted sensor networks; Collaborative Technologies and Systems (CTS), 2010 International Symposium on Date of Conference: May 17-21, 2010; pp. 581-592; IEEE Xplore.*

(Continued)

*Primary Examiner* — Bradley Holder
(74) *Attorney, Agent, or Firm* — Schwegman Lundberg & Woessner, P.A.

(57) ABSTRACT

Techniques for establishing a trusted cloud service are provided. Packages are created for services that include certificates, configuration information, trust information, and images for deploying instances of the services. The packages can be used to deploy the services in trusted environments and authenticated to deploy in sub environments of un-trusted environments. The sub environments are trusted by the trusted environments. Also, clouds are prospected for purposes of identifying desirable clouds and creating the packages for deployment.

15 Claims, 6 Drawing Sheets

(56) References Cited

U.S. PATENT DOCUMENTS

2012/0159506 A1* 6/2012 Barham ............... G06F 9/5044
718/104
2012/0284780 A1 11/2012 Bergeson et al.

OTHER PUBLICATIONS

Gasti et al.; Deniable cloud storage: sharing files via public-key deniability; Proceeding WPES '10 Proceedings of the 9th annual ACM workshop on Privacy in the electronic society; 2010; pp. 31-42; ACM Digital Library.*

Gasti, Paolo, et al., "Deniable cloud storage: sharing files via public-key deniability", Proceeding WPES '10 Proceedings of the 9th annual ACM workshop on Privacy in the electronic society; ACM Digital Library, 31-42.

Kapadia, Apu, et al., "Secure cloud computing with brokered trusted sensor networks", Collaborative Technologies and Systems (CTS), 2010 International Symposium on Date of Conference: IEEE Xplore, (May 21, 2010), 581-592.

* cited by examiner

TECHNIQUES FOR ESTABLISHING A TRUSTED CLOUD SERVICE

This application is a divisional of U.S. patent application Ser. No. 13/100,937, filed on May 4, 2011, now issued as U.S. Pat. No. 8,813,192, which is incorporated herein by reference in its entirety.

BACKGROUND

Cloud computing is rapidly changing the Internet into a collection of clouds, which provide a variety of computing resources, storage resources, and, in the future, a variety of resources that are currently unimagined.

Yet, frequently it is difficult to effectively provide a given service from a single environment. This is so because a product or service offering often requires the cooperation of multiple services in providing functionality sufficient to be considered holistic.

Historically, service offerings deployed in an enterprise data center could be sufficiently controlled to ensure that trust relationships between the cooperating services were maintained. However, as seen in recent years, many service offering deployments grow to include multiple heterogeneous environments, which span multiple network segments, data center locations and/or include both data center (inside the firewall) and cloud (un-protected by firewall) environments. Such data center/cloud deployment environments are unsuitable for many service offerings; hampering the desired flexibility of the Information Technology (IT) department in providing low cost services to the enterprise.

That is, it is cost ineffective and impractical to think a given service can in all cases be wholly contained with all the supporting services it needs within a single cloud environment and yet the trend in the industry is to outsource services and data to cloud environments.

SUMMARY

Various embodiments of the invention provide techniques for establishing a trusted cloud service. Specifically, and in one embodiment a method for deploying services to an ad hoc environment from a trusted environment where the ad hoc environment is un-trusted is presented.

An environment specification for a target environment is obtained that is un-trusted; the environment specification obtained within a trusted environment. Next, a package is created to include: certificates, a service image for a migrating service that is migrating to the target environment, a service identifier for the migrating service, and a package identifier for the package. Then, trust configuration information is established for the target environment having a trust configuration identifier. The trust configuration information is included in the package and the package is sent to a target service in the target environment for deployment of an instance of the migrating service, via the service image, within a created sub environment of the target environment that establishes trust with the trusted environment by processing components of the package.

DETAILED DESCRIPTION

Figure 1:
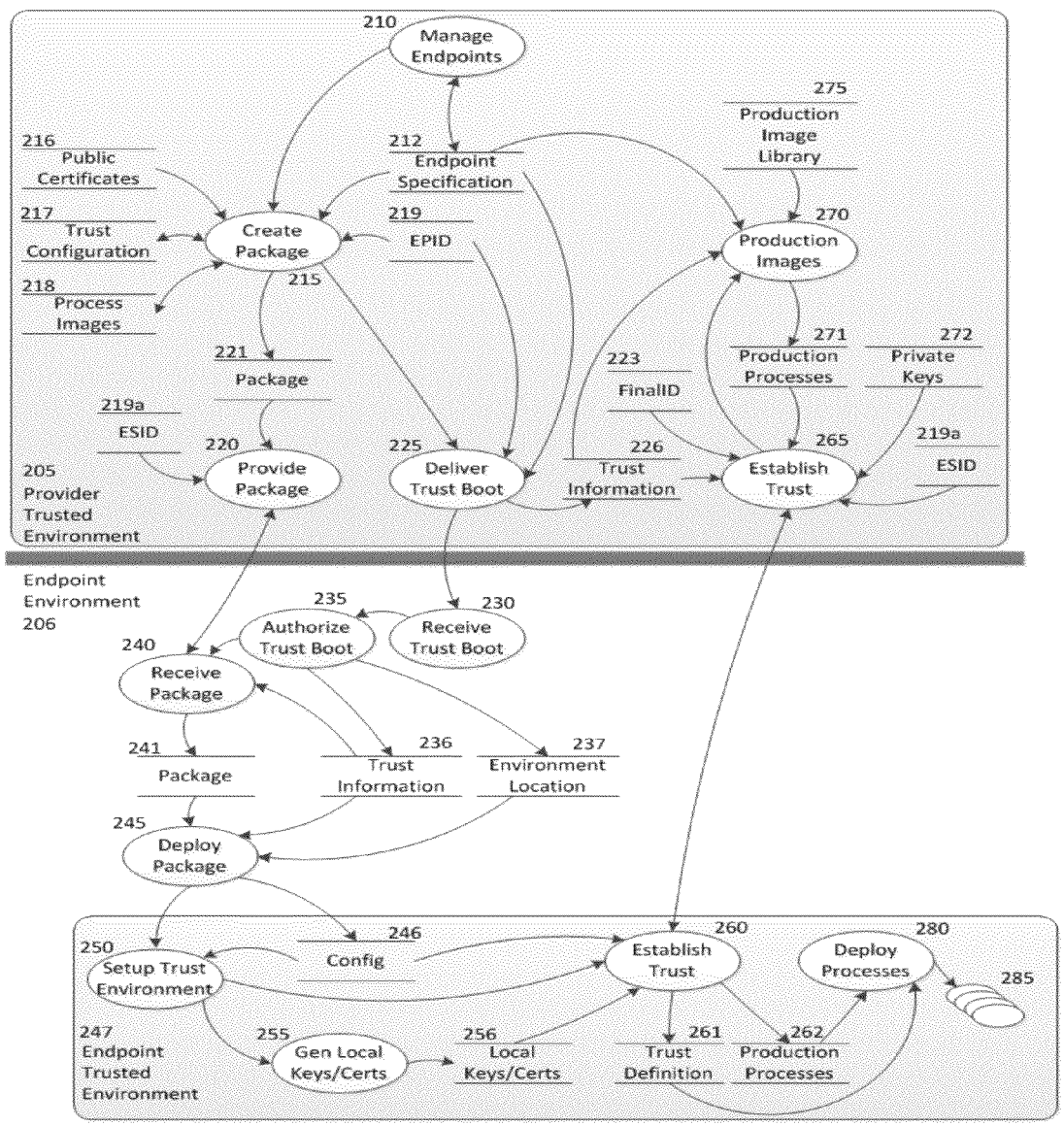
FIG. 1 is a diagram depicting a technique for deploying services to an ad hoc environment from a trusted environment where the ad hoc environment is un-trusted, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell, Inc.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

As will be demonstrated in greater detail herein and below, the techniques provide mechanisms by which a service deployed in an ad hoc environment can initiate other services, where a trust relationship between the initiator and the service is established. The mechanisms can also be used to establish the secure communication channels in preparation for other trusted services to be deployed in the same ad hoc environment.

Figure 2:
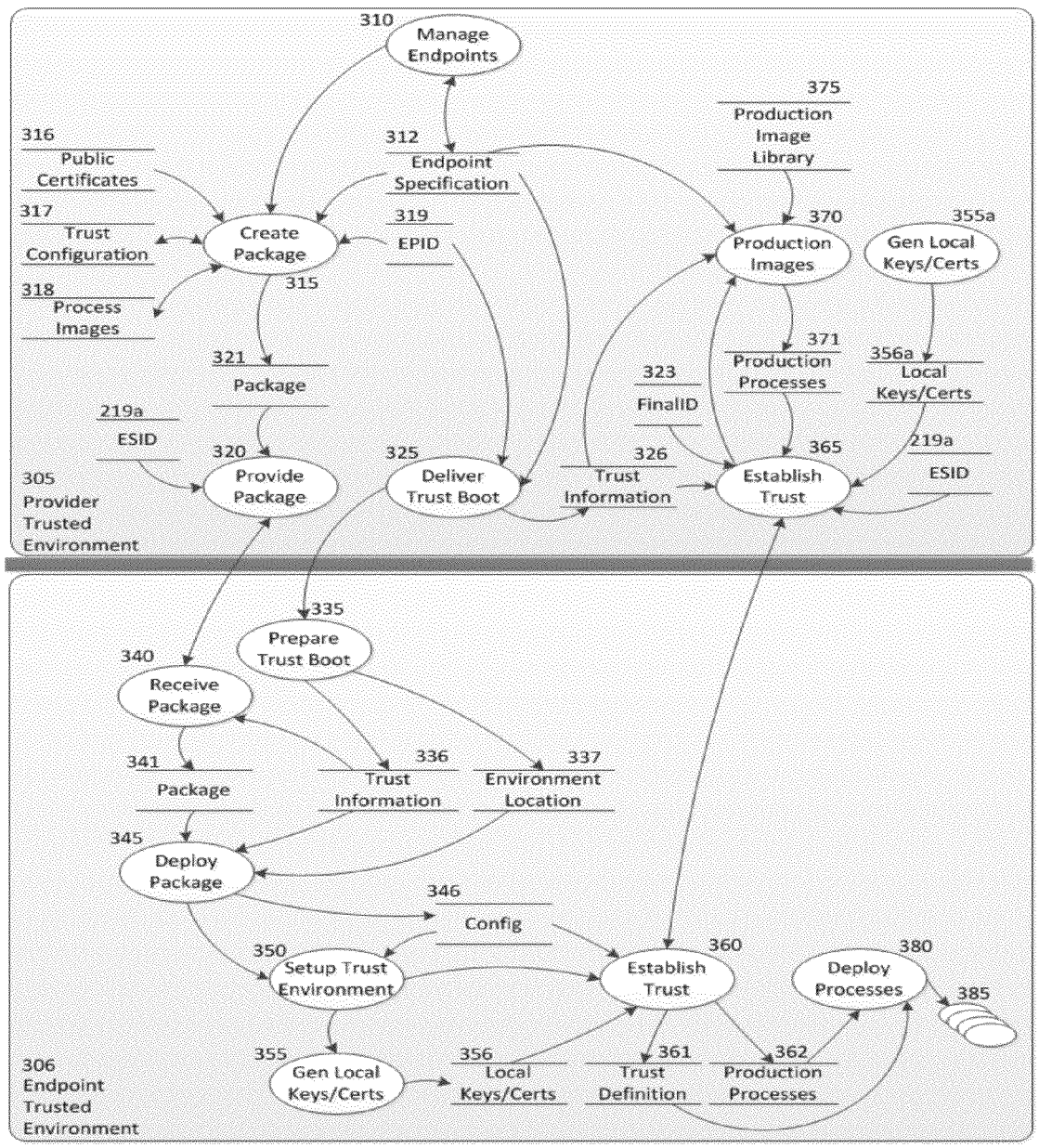
FIG. 2 is a diagram depicting a technique for deploying services to an ad hoc environment from a trusted environment where the ad hoc environment is trusted, according to the techniques presented herein.
Figure 3:
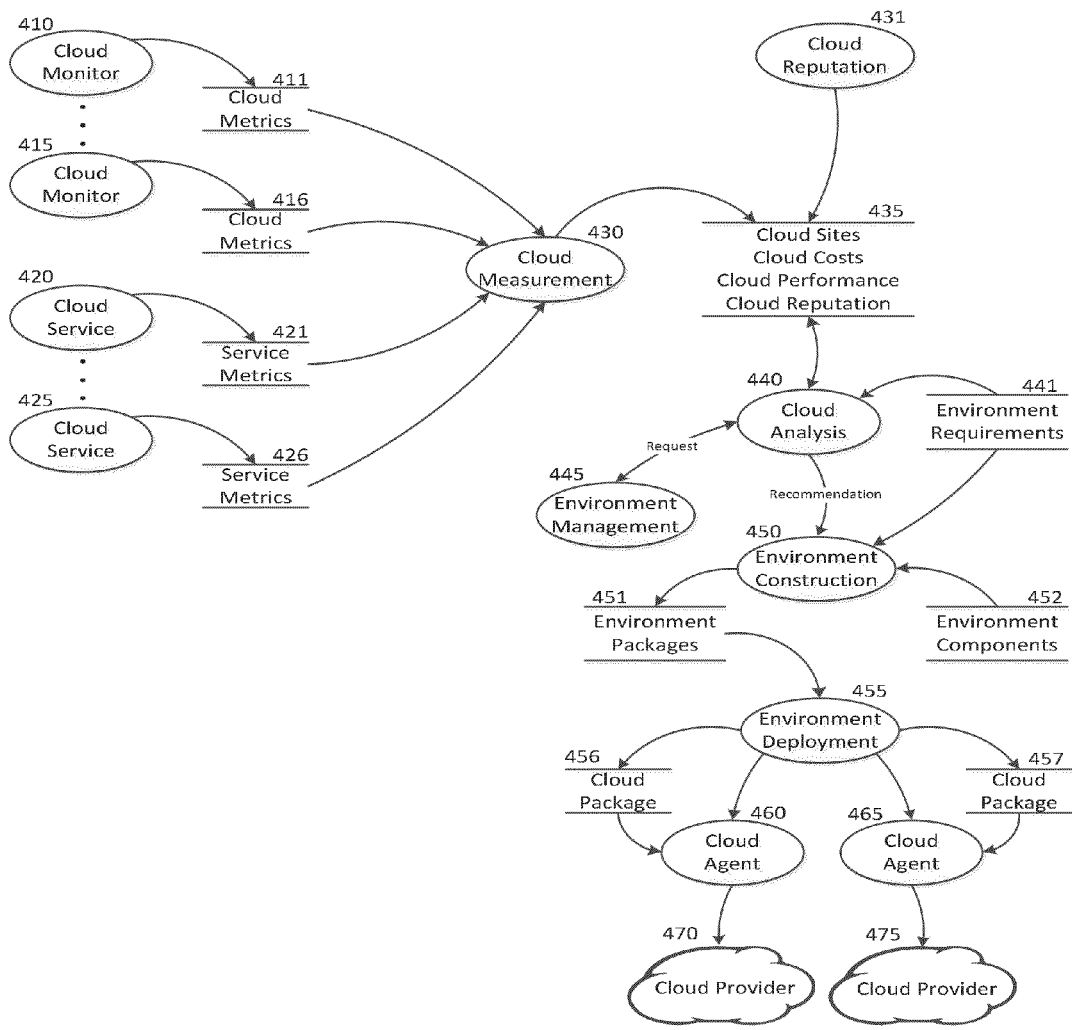
FIG. 3 is a diagram depicting a technique for discovering a new un-trusted environment via client prospecting analysis and deploying services to that new un-trusted ad hoc environment, according to the techniques presented herein.
Figure 5:
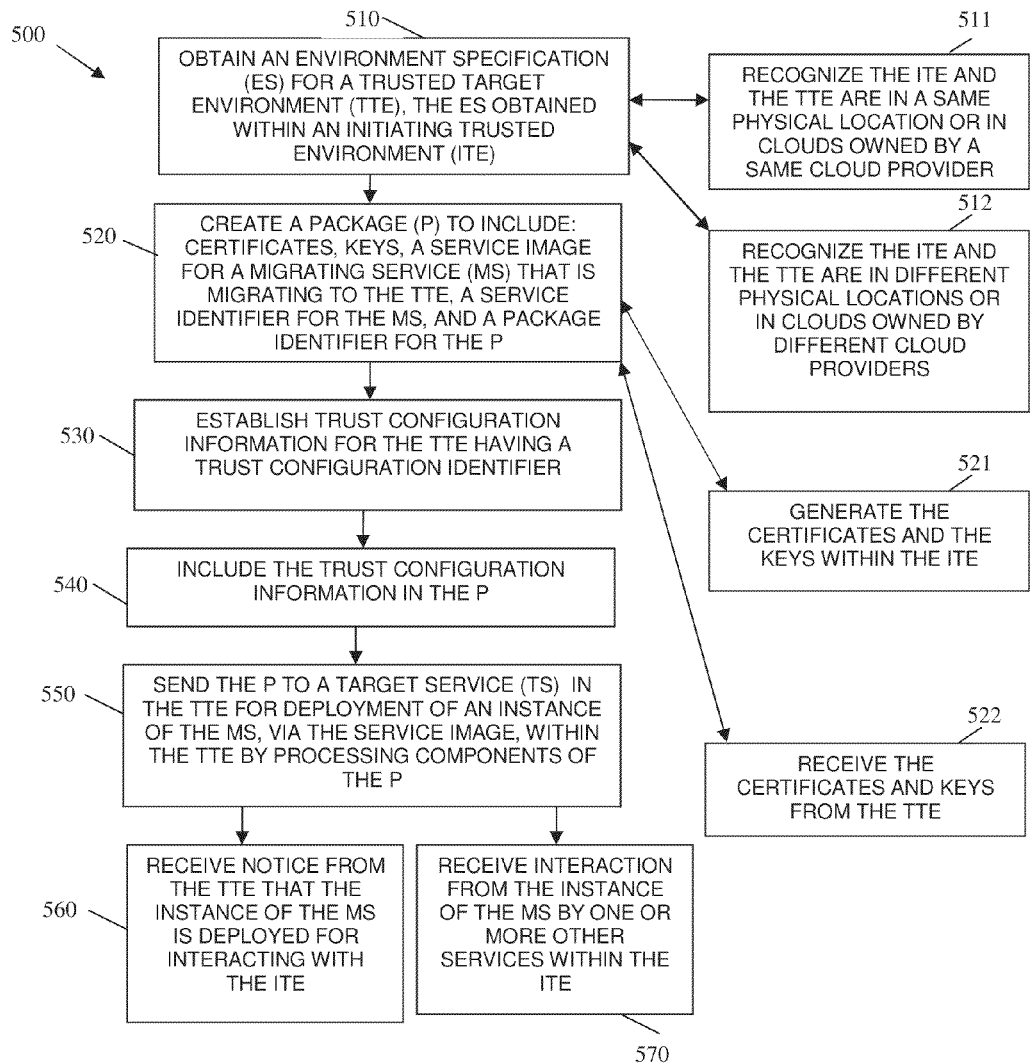
FIG. 5 is a diagram of a method for deploying services from a trusted environment to an ad hoc environment that is trusted as presented in the FIG. 2, according to an example embodiment.
Figure 6:
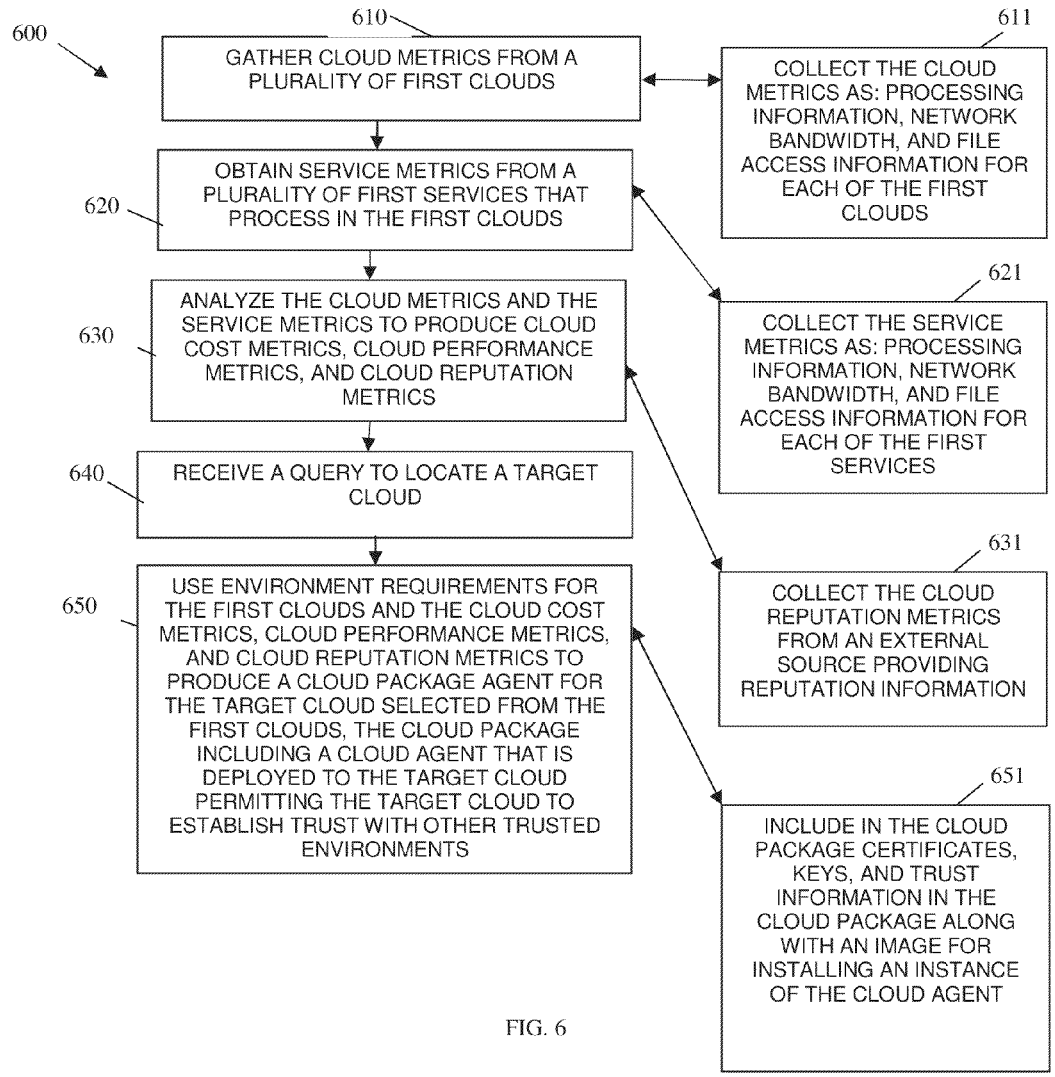
FIG. 6 is a diagram of a method for finding a new un-trusted ad hoc environment via client prospecting analysis and deploying services to that new un-trusted ad hoc environment as presented in the FIG. 3, according to an example embodiment.

The embodiments are broken into three primary areas: 1: deploying to an ad hoc environment from a trusted environment where the ad hoc environment is un-trusted (FIGS. 1 and 4); 2: deploying to an ad hoc environment from a trusted environment where the ad hoc environment is also trusted (FIGS. 2 and 5); and 3: finding a new un-trusted ad hoc environment via client prospecting analysis and deploying to that new un-trusted ad hoc environment (FIGS. 3 and 6).

It is within this context that embodiments of the invention are now discussed within the context of the FIGS. 1-6.

FIG. 1 is a diagram depicting a technique for deploying services to an ad hoc environment from a trusted environment where the ad hoc environment is un-trusted, according to the techniques presented herein. It is noted that the FIG. 1 is presented for purposes of illustration and comprehension. It is to be understood that other arrangements and/or components can be used to achieve the teachings presented herein and below.

The components of the FIG. 1 are implemented in non-transitory and processor-readable storage medium and are executed on physical processors on one or more networks. Each processor specifically configured to execute the components.

The embodiments herein proceed as follows where the Provider Trusted Environment 205 is deploying to an un-trusted Endpoint Environment 206.

Manage Endpoints 210 is used to maintain an Endpoint Specification 212, where the Endpoint Specification 212 specifies the information concerning the Endpoint Environment 206. The Manage Endpoints 210 then invokes Create Package 215.

Create Package 215 utilizes: the Endpoint Specification 212, the Public Certificates 216 of the Provider Trusted Environment 205, the Process Images 218, and the EPID 219, where the Public Certificates 216 contains the public key certificates used by the Provider Trusted Environment 205 to encrypt information that can only be decrypted by the associated private key owned by The Provider Trusted Environment 205, where the Process Images 218 contains the process images to be delivered to the Endpoint Environment 206, which will commence the establishment of a trusted environment and finish with a fully deployed trusted environment, where the Trust configuration 217 contains previously defined Trust Configuration information, which provides the Create Package 215 with information necessary to properly construct Package 221 and where the Trust Configuration 217 is annotated by the Create Package 215 concerning the FinalID 223 used to secure the new Endpoint Trusted Environment 247. In an embodiment, the Trust Configuration 217 is also annotated with the EPID (Ephemeral Package Identifier) 219 and ESID 219a (Ephemeral Service Identifier).

The final result of the Create Package 215 is the creation of the Package 221, which contains a package of information usable by the Endpoint Environment 206 to build the Endpoint Trusted Environment 247.

The Create Package 215 invokes Deliver Trust Boot 225, which consumes the information from the Endpoint Specification 212 to determine how to deliver the notification that the Package 221 is available. The Deliver Trust Boot 225 creates Trust Information 226, which contains the full information of the trust content to be delivered as the Trust Boot 225. The value of EPID 219, which is to be used to secure the Package 221 for the creation of the Endpoint Trusted Environment 247, is also contained within the notification to the Receive Trust Boot 230.

The Receive Trust Boot 230 receives the notification from the Trust Boot 225 along with the contents of the notification from the Trust Information 226 and invokes the Authorized Trust Boot 235. The Authorize Trust Boot 235 is a process, which requires a trusted authority to authorize the creation of the Endpoint Trusted Environment 247 and to specify the Environment Location 237. The Authorize Trust Boot 235 creates Trust Information 236 as a part of the authorization step and then invokes the Receive Package 240.

Part of the information delivered via the Deliver Trust Boot 225 to the Receive Trust Boot 230 is the location where the Receive Package 240 is to retrieve the Package 221 from the Provide Package 220 using the EPID 219 as proof of trust. In an embodiment, the Provide Package 220 receives the address of the Receive Package 240 from the Authorize Trust Boot 235 (dataflow not shown in the FIG. 1) and the Package 241 is delivered along with the ESID 219a. In either embodiment, the resultant Package 241 is provided and, if necessary, is decrypted according to the information received in the Trust Information 236.

At this point, a trusted authority has authorized the deployment of the Package 221 from the Provider Trusted Environment 205 into an environment specified in the Environment Location 237.

The Deployed Package 245 deploys the various processes contained in the Package 241 utilizing the information in the Trust Information 236 and the Environment Location 237 to begin creating the Endpoint Trusted Environment 247.

The beginning of the creation of the Endpoint Trusted Environment 247 is the deployment and instantiation by the Deployed Package 245 of the Set up Trust Environment 250 and the creation of the Configuration File 246. The Configuration File 246 contains information received from the Provider Trusted Environment 205 via either the Trust Information 226 or the Package 221.

The Setup Trust Environment 250 is a process instantiated within the Endpoint Trusted Environment 247, which was received by the Endpoint Environment 206 from the Provider Trusted Environment 205. Thus, the process has been retrieved from the Provider Trusted Environment 205. The Provider Trusted Environment 250 configures itself according to the information in the Configuration File 246 and instantiates another process provided by the Configuration File 245 called Gen Local Keys/Certs 255. The Gen Local Keys/Certs 255 constitutes the public and private keys and associated certificates used to establish the Endpoint Trusted Environment 247. It is critical that the keys and certificates in the Local Keys/Certs 256 be generated at the endpoint to provide both an Endpoint Trusted Environment 247 and to secure the information in the Endpoint Trusted Environment 247 even from the Provider Trusted Environment 205.

The Setup Trust Environment 250 now instantiates the Establish Trust 260 which, using the Configuration File 246, communicates with the Establish Trust 260 via an address provided by the Establish Trust 246 and proves that the environment being created at the Endpoint Trusted Environment 247 is authentic by establishing trust credentials using the ESID 219a, which was delivered as part of either the Receive Trust Boot 230 or the Package 241.

The Establish Trust 260 creates the Trust Definition 261 from the information delivered via the Receive Trust Boot 230 and the Package 241 and augments the Trust Definition 261 with information received from the Establish Trust 265 as a result of the successful trust establishment because of the utilization of the correct ESID 219a (Ephemeral Service Identifier) as well as receiving the FinalID 223, which becomes the permanent identifier for the trusted communication path between the Provider Trusted Environment 205 and the Endpoint Environment 206. Part of the establishment of this trust, is the delivery of the FinalID 223 from the Establish Trust 265 to the Establish Trust 260, which is key and certificate information used in communicating with the Provider Trusted Environment 205. The FinalID 223 is communicated to the Establish Trust 260 and saved in the Trust Definition 261 only if the correct information is exchanged between the Public Certificates 216 and the Establish Trust 265 utilizing either encryption and or digital signature technology, which uses the FinalID 223 and other certificates and/or keys as the active crypto material.

If the trust is established the Establish Trust 265 invokes the Production Images 270, which utilizes the Trust Information 226, the Endpoint Speciation 212, and process images in the Production Image Library 275 to provide the Production Processes 271. The Trust Definition 261 utilizes the Private Keys 272 or crypto material associated with the Private Keys 272 with the Public Certificates 216 as appropriate.

The end result is the secure and trusted transmission of the Production Processes 262, which is utilized by the Deployed Processes 280 together with the Trust Definition 261 and the Production Processes 262 to deploy the final Endpoint Trusted Environment 247 as shown by the cascaded process bubbles 285 in the FIG. 1. In an embodiment, the appropriate public key certificates are exchanged between the Establish Trust 260 and the Establish Trust 265 and stored as an annotation in the Trust Configuration 217 (dataflow not shown in the FIG. 1).

In an embodiment the Setup Trust Environment 250, the Deliver Trust Boot 225, the Configuration File 246, and the Establish Trust 260 are no longer used when the Endpoint Trusted Environment 247 is restarted or re-instantiated because the information has already been exchanged, trust established, and the appropriate key information provided.

The end result of the above invention mechanisms is the creation of the Endpoint Trusted Environment 247, where the processes within the environment 247 can be trusted by the Provider Trusted Environment 205 as can any traffic communicated between the production processes instantiated at 285 (identified in the FIG. 1 as the cascading bubbles).

FIG. 2 is a diagram depicting a technique for deploying services to an ad hoc environment from a trusted environment where the ad hoc environment is trusted, according to the techniques presented herein. Again, the diagram is presented for purposes of illustrating and to provide for ease of comprehension.

According to the FIG. 2, the embodiment provides for mechanisms to create an Endpoint Trusted Environment 306 within an already trusted environment known by the Provider Trusted Environment 305. In an embodiment, the Provider Trusted Environment 305 and the Endpoint Trusted Environment 306 may even be in the same physical location or owned by a same cloud provider. The embodiment operates whether the Provider Trusted Environment 305 and the Endpoint Trusted Environment 306 are in the same location or different locations; the only requirement being that network conductivity between the two environments is provided.

The process proceeds the same as discussed above with reference to the FIG. 1 except that the authorization of the Trust Boot 325 and 335 is not required because the two environments already trust each other.

In an embodiment the local keys and certificates are generated in the Endpoint Trusted Environment 306 via the Gen Local Keys/Certs 355 and stored in the Local Keys/Certs 356. In another embodiment, those keys are created in the Gen Local Keys/Certs 355a and stored the Local Keys/Certs 356a and are provided as part of the exchange between the Establish Trust 365 and the Establish Trust 360. These two embodiments are possible because the Provider Trusted Environment 305 and the Endpoint Trusted Environment 306 are already in a trusted environment and it is immaterial whether the local keys and certificates are generated in the Provider Trusted Environment 305 or the Endpoint Trusted Environment 306. In an embodiment, the customer of the cloud provider that will be using the Endpoint Trusted Environment 306 may want to be sure that the keys generated by Gen Local Keys/Certs 355 are generated in the environment where the trusted processing is taking place. Thus, there are two embodiments where keys and certificates can be generated either in the Provider Trusted Environment 305 or the Endpoint Trusted Environment 306.

FIG. 3 is a diagram depicting a technique for discovering a new un-trusted environment via client prospecting analysis and deploying services to that new un-trusted ad hoc environment, according to the techniques presented herein. Once more the FIG. 3 is presented for purposes of illustration and comprehension.

The FIG. 3 depicts novel mechanisms, which allow for the discovery and creation of ad hoc processing locations, which are on trusted environments as in the FIG. 1. The purpose is the discovery of new and previously unknown Cloud Providers 470 and 475 that can be used to create trusted environments. Note that while only two clouds are shown (e.g. 470 and 475) that the actual number of clouds operable can be from one to many. Of course, zero clouds may be qualified, which would not involve any useful creation of a trusted environment.

The material in the FIG. 3 utilizes the Cloud Monitor 410 and 415 (the " . . . " between 410 and 415 indicate that from one to many such Cloud Monitors may be in use).

The Cloud Monitors 410 and 415 produce the Cloud Metrics 411 and 416. These captured metrics provide information concerning relevant processing, network bandwidth, file access etc. at the clouds being monitored.

Likewise, Cloud Services 420 and 425 (known to the prospecting service depicted in the FIG. 3) are sending Service Metrics 421 and 426, which provide information concerning relevant processing, network bandwidth, file access, etc. at the various locations where the cloud services are operable.

Cloud Measurement 430 analyzes the information in the Cloud Metrics 411 and 416, and the Service Metrics 421 and 426 to produce the Cloud Sites, Cloud Costs, Cloud Performance, and Cloud Reputation 435, which is aggregated information concerning Cloud Sites, Cloud Costs, Cloud Performance, and Cloud Reputation. In an embodiment, the Cloud Reputation 431 also provides information concerning cloud reputations as gathered the Cloud Reputation 431 from sources external to the embodiments discussed herein.

The Cloud Analysis 440 utilizes the information in Environment Requirements 441 to analyze the content of the Cloud Sites, Cloud Costs, Cloud Performance, and Cloud Reputation 435 in response to a query or interaction with Environment Management 445. The results of this analysis is the recommendation to the Environment Construction 450, which utilizes the Environment Requirements 441, the Environment Components 452 to create the Environment Packages 451, which are specific packages that can be used according to the FIG. 1 to create a new trusted environment at the cloud site recommended by the Cloud Analysis 440.

The Environment Deployment 445 utilizes the Environment Packages 451 to create the various Cloud Package 456 and 457 and then instantiates the Cloud Agents 460 and 465, which are specific agents that operate within the application programming interface of the Cloud Provider 470 and 475 to deploy the Cloud package 456 and 457. This is according to the discussion presented above with respect to the FIG. 1.

In an embodiment the various certificates, keys, configurations, images, specifications and information may be stored in and provided by Configuration Management Database (CMDB), such as an Information Technology Infrastructure Library (ITIL) CMDB.

Some of the keys and certificates may be specified for signature only, while other keys and certificates are specified for encryption only. Moreover, utilization of asymmetric keys in conjunction with symmetric keys in order to encrypt information can be used. Embodiments herein utilize these technologies in ways that are appropriate.

Figure 4:
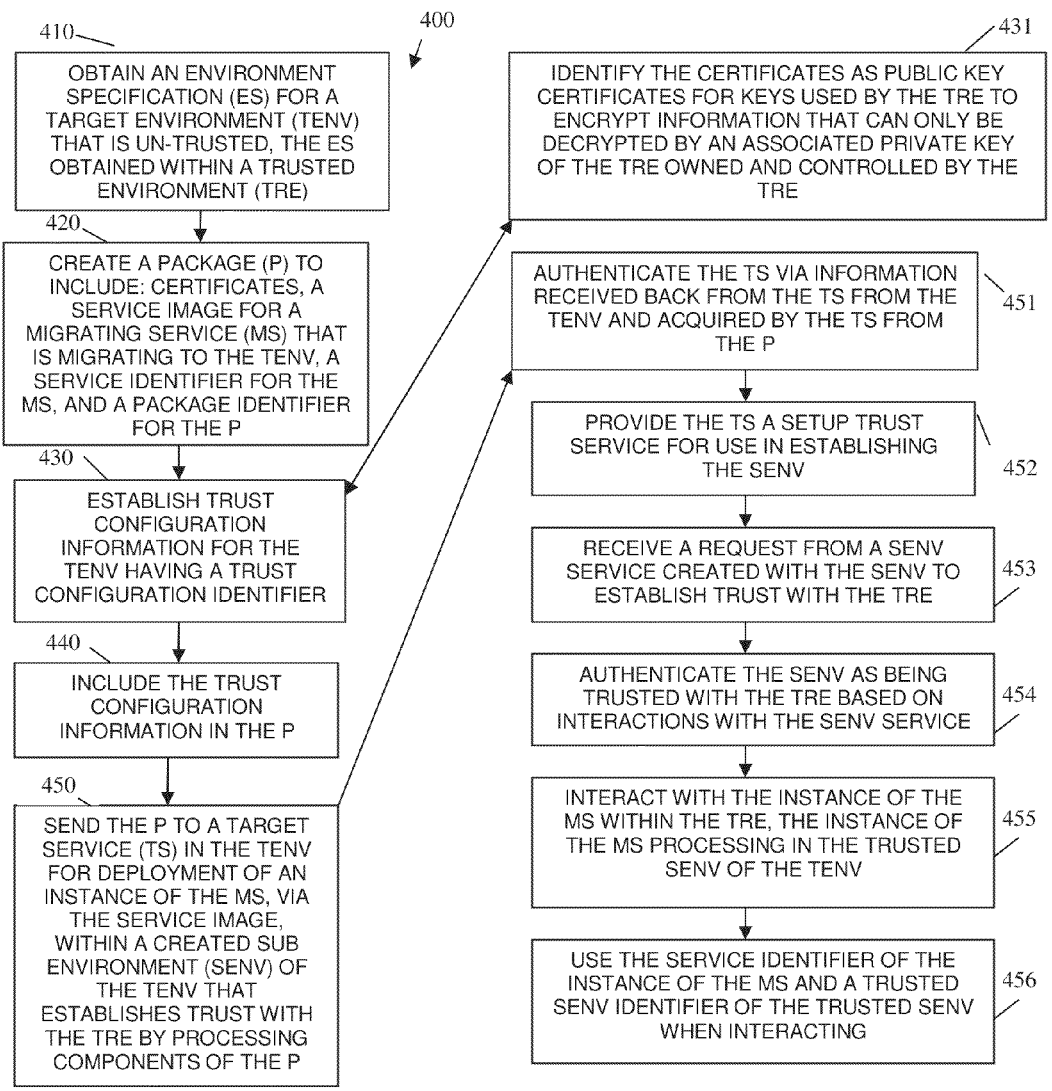
FIG. 4 is a diagram of a method for deploying services from a trusted environment to an ad hoc environment that is un-trusted as presented in the FIG. 1, according to an example embodiment.

FIG. 4 is a diagram of a method 400 for deploying services from a trusted environment to an ad hoc environment that is un-trusted as presented in the FIG. 1, according to an example embodiment. The method 400 (herein referred to as "an ad hoc and un-trusted service deployer") is implemented, programmed, and resides within a non-transitory machine-readable storage medium that executes on one or more processors of a network. The network may be wired, wireless, or a combination of wired and wireless.

The ad hoc and un-trusted service deployer processes with a trusted environment.

At 410, the ad hoc and un-trusted service deployer obtains an environment specification for a target environment. The target environment is un-trusted and the environment specification is obtained within a trusted environment.

At 420, the ad hoc and un-trusted service deployer creates a package (data structure) to include certificates, a service image for a migrating service that is migrating to the target environment, a service identifier for the migrating service, and a package identifier for the package.

At 430, the ad hoc and un-trusted service deployer establishes trust configuration information for the target environment that has a trust configuration identifier. Details of the trust configuration information were provided above with reference to the FIG. 1.

According to an embodiment, at 431, the ad hoc and un-trusted service deployer identifies certificates as public key certificates for keys used by the trusted environment to encrypt information that can only be decrypted by an associated private key, which is owned and controlled by the trusted environment. In other words, keys are provided for verification and encryption to the un-trusted environment, via the package, so secure communications can be achieved with the instance of the migrating service once it is deployed in the un-trusted target environment.

At 440, the ad hoc and un-trusted service deployer includes the trust configuration information in the package.

At 450, the ad hoc and un-trusted service deployer sends the package to a target service in the target environment for deployment of an instance of the migrating service, via the service image, within a created sub environment of the target environment that establishes trust with the trusted environment by processing components of the package. The components of the package are processed in the manner discussed above with respect to the FIG. 1 and the Endpoint Environment 206 (target un-trusted environment). Essentially, the un-trusted environment has a sub environment carved out of it by processing the package and that sub environment is where the instance of the migrating service is deployed. The sub environment is trusted by the trusted environment.

According to an embodiment, at 451, the ad hoc and un-trusted service deployer authenticates the trusted service of the package via information received back from the target service and acquired from the trusted service from the package. The details of this authentication mechanism were presented above with reference to the FIG. 1.

Continuing with the embodiment of 451 and at 452, the ad hoc and un-trusted service deployer provides the trusted service a setup trust service for use in establishing the sub environment.

Still continuing with the embodiment of 452 and at 453, the ad hoc and un-trusted service deployer receives a request from a sub environment service created with the sub environment to establish trust with the trusted environment.

Also continuing with the embodiment of 453 and at 454, the ad hoc and un-trusted service deployer authenticates the sub environment as being trusted with the trusted environment based on interactions with the sub environment service.

Continuing with the embodiment of 454 and at 455, the ad hoc and un-trusted service deployer interacts with the instance of the migrating service within the trusted environment. The instance of the migrating service processes in the trusted sub environment of the target environment.

Finally, continuing with the embodiment of 455 and at 456, the ad hoc and un-trusted service deployer uses the service identifier of the instance of the migrating service and a trusted sub environment identifier of the trusted sub environment when interacting.

The processing of the FIG. 1 and the ad hoc and un-trusted service deployer demonstrate how a trusted environment can package one or more services together for deployment in an un-trusted environment by creating and authenticating a trusted sub environment from which interaction with the one or more service can occur with the trusted environment.

FIG. 5 is a diagram of a method 500 for deploying services from a trusted environment to an ad hoc environment that is trusted as presented in the FIG. 2, according to an example embodiment. The method 500 (herein after referred to as "an ad hoc and trusted service deployer") is implemented, programmed, and resides within a non-transitory machine-readable storage medium that executes on one or more processors of a network. The network may be wired, wireless, or a combination of wired and wireless.

At 510, the ad hoc and trusted service deployer obtains an environment specification for a trusted target environment. The environment specification is obtained within an initiating trusted environment.

According to an embodiment, at 511, the ad hoc and trusted service deployer recognizes the initiating trusted environment and the target trusted environment are in the same physical location or in clouds owned by a same cloud provider.

In an embodiment, at 512, the ad hoc and trusted service deployer recognizes the initiating trusted environment and the target trusted environment are in different physical locations or in clouds owned by different cloud providers.

At 520, the ad hoc and trusted service deployer creates a package to include certificate, keys, a service image for a migrating service that is migrating to the trusted target environment, a service identifier for the migrating service, and a package identifier for the package.

In an embodiment, at 521, the ad hoc and trusted service deployer generates the certificates and the keys within the initiating trusted environment.

Alternatively, in another case, at 522, the ad hoc and trusted service deployer receives the certificates and the keys from the trusted target environment.

Because both of the environments are trusted, the certificates and keys can be generated in either environment unlike the scenario of the FIGS. 1 and 3, where initially the certificates and the keys are generated from the trusted environment.

At 530, the ad hoc and trusted service deployer establishes trust configuration information for the trusted target environment for the trusted target environment having a trust configuration identifier.

At 540, the ad hoc and trusted service deployer includes the trust configuration information in the package.

At 550, the ad hoc and trusted service deployer sends the package to a target service in the trusted target environment for deployment of an instance of the migrating service, via the service image, within the trusted target environment by processing the components of the package (as discussed above with reference to the FIGS. 1 and 2).

According to an embodiment, at 560, the ad hoc and trusted service deployer receives notice from the trusted target environment that the instance of the migrating service is deployed for interacting with the initiating trusted environment.

In still another case, at 570, the ad hoc and trusted service deployer receives interaction from the instance of the migrating service by one or more other services within the initiating target environment.

It is now seen, via the discussion of the FIG. 2 and the processing of the ad hoc and trusted service deployer that two trusted environments can deploy services between them for purposes of establishing trust between the services.

FIG. 6 is a diagram of a method 600 for finding a new un-trusted ad hoc environment via client prospecting analysis and deploying services to that new un-trusted ad hoc environment as presented in the FIG. 3, according to an example embodiment. The method 600 (hereinafter referred to as "un-trusted ad hoc environment prospector") is implemented, programmed, and resides within a non-transitory machine-readable storage medium that executes on one or more processors of a network. The network may be wired, wireless, or a combination of wired and wireless.

At 610, the un-trusted ad hoc environment prospector gathers cloud metrics from a plurality of first clouds.

According to an embodiment, at 611, the un-trusted ad hoc environment prospector collects the cloud metrics as: processing information, network bandwidth, and file access information for each of the first clouds.

At 620, the un-trusted ad hoc environment prospector obtains service metrics from a plurality of first services that processes in the first clouds.

According to an embodiment, at 621, the un-trusted ad hoc environment prospector collects the service metrics as: processing information, network bandwidth, and file access information for each of the first services.

At 630, the un-trusted ad hoc environment prospector analyzes the cloud metrics and the service metrics to produce cloud cost metrics, cloud performance metrics, and cloud reputation metrics.

In an embodiment, at 631, the un-trusted ad hoc environment prospector collects the cloud reputation metrics from an external source providing reputation information.

At 640, the un-trusted ad hoc environment prospector receives a query to locate a target cloud.

At 650, the un-trusted ad hoc environment prospector uses environment requirements for the first clouds and the cloud cost metrics, cloud performance metrics, and cloud reputation metrics to produce a cloud package agent for the target cloud selected from the first clouds. The cloud package includes a cloud agent that is deployed to the target cloud and that permits the target cloud to establish trust with other trusted environments.

According to an embodiment, at 651, the un-trusted ad hoc environment prospector includes in the cloud package certificates, keys, and trust information in the cloud package along with an image for installing an instance of the cloud agent.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
obtaining, by a hardware processor, an environment specification for a trusted target environment, the environment specification obtained within an initiating trusted environment;
creating, by the hardware processor, a package using the environment specification to include: certificates, keys, a service image for a migrating service that is migrating to the trusted target environment, a service identifier for the migrating service, and a package identifier for the package;
establishing, by the hardware processor, trust configuration information for the trusted target environment having a trust configuration identifier;
including, by the hardware processor, the trust configuration information in the package;
sending, by the hardware processor, the package to a target service in the trusted target environment for deployment of an instance of the migrating service, via the service image, within the trusted target environment by processing components of the package;
receiving notice from the trusted target environment that the instance of the migrating service is deployed for interacting with the initiating trusted environment; and
receiving interaction from the instance of the migrating service by one or more other services within the initiating trusted environment.

2. The method of claim 1, wherein obtaining further includes recognizing the initiating trusted environment and the trusted target environment are in a same physical location or in clouds owned by a same cloud provider.

3. The method of claim 1, wherein obtaining further includes recognizing the initiating trusted environment and the trusted target environment are in different physical locations or in clouds owned by different cloud providers.

4. The method of claim 1, wherein creating further includes generating the certificates and the keys within the initiating trusted environment.

5. The method of claim 1, wherein creating further includes receiving the certificates and keys from the trusted target environment.

6. A non-transitory computer-readable medium having executable instructions that when executed by a hardware computing device performs a method, to:
 obtain an environment specification for a trusted target environment, the environment specification obtained within an initiating trusted environment;
 create a package to migrate a service image for a service to the trusted target environment using the environment specification, establishing trust configuration information for the trusted target environment having a trust configuration identifier, the package including trust configuration information, and the packaging including certificates, keys, a service image for a migrating service that is migrating to the trusted target environment, a service identifier for the migrating service, and a package identifier for the package;
 send the package to a target service in the trusted target environment for deploying an instance of the migrating service using the package through the service image and by processing components of the package within the trusted environment;
 receive notice from the trusted environment that an instance of the migrating service is deployed for interacting with the initiating trusted environment; and
 receive interaction from the instance of the migrating service by one or more other services within the initiating trusted environment.

7. The medium of claim 6, wherein the instruction to obtain further includes instructions to locate the specification in one or more clouds owned by a same cloud provider.

8. The medium of claim 6, wherein the instruction to obtain further includes instructions to acquire the specification from the trusted environment.

9. The medium of claim 6, wherein the instruction to create further includes instructions to provide the certificates and the keys within the package for use by the service once deployed to the trusted environment.

10. The medium of claim 9, wherein the instruction to provide further includes instructions to receive the certificates and the keys from the trusted environment.

11. The medium of claim 9, wherein the instruction to provide further includes instructions to generate the certificate and the keys independent of the trusted environment.

12. A system, comprising:
 a hardware processor;
 an ad hoc and trusted service deployer configured and adapted to: i) execute on the hardware processor, ii) obtain an environment specification for a trusted target environment, the environment specification obtained within an initiating trusted environment, iii) create a deployment package based on the environment specification for a trusted target environment for a service being deployed to the trusted target environment, the package including certificates, keys, a service image for a migrating service that is migrating to the trusted target environment, a service identifier for the migrating service, and a package identifier for the package, iv) establish trust configuration information for the trusted target environment having a trust configuration identifier, v) include the trust configuration information in the package, vi) send the package to a target service in the trusted target environment for deployment of an instance of the migrating service, via the service image, within the trusted target environment by processing components of the package, vii) receive notice from the trusted target environment that an instance of the migrating service is deployed for interacting with the initiating trusted environment, and viii) receive interaction from the instance of the migrating service by one or more other services within the initiating trusted environment.

13. The system of claim 12, wherein the ad hoc and trusted service deployer is further adapted and configured to create the keys and the certificates within the deployment package for use by the service once deployed in the trusted environment.

14. The system of claim 12, wherein the ad hoc and trusted service deployer is further configured and adapted to obtain the specification from the trusted environment.

15. The system of claim 12, wherein the ad hoc and trusted service deployer is further adapted and configured, in iii), to: send the package to a trusted service deployer within the trusted environment.

* * * * *